United States Patent [19]
Moon et al.

[11] Patent Number: 5,758,045
[45] Date of Patent: May 26, 1998

[54] SIGNAL PROCESSING METHOD AND APPARATUS FOR INTERACTIVE GRAPHICS SYSTEM FOR CONTEMPORANEOUS INTERACTION BETWEEN THE RASTER ENGINE AND THE FRAME BUFFER

[75] Inventors: Sang-ho Moon; Jun-hyoung Cho, both of Suwon, Rep. of Korea

[73] Assignee: Samsung Electronics Co., Ltd., Suwon, Rep. of Korea

[21] Appl. No.: 848,698

[22] Filed: Apr. 29, 1997

Related U.S. Application Data

[63] Continuation of Ser. No. 365,823, Dec. 29, 1994, abandoned.

[30] Foreign Application Priority Data

Jun. 30, 1994 [KR] Rep. of Korea .............. 9415683

[51] Int. Cl.$^6$ ............................................. G06T 3/00
[52] U.S. Cl. ..................... 395/122; 395/520; 395/526
[58] Field of Search .......................... 395/122, 501, 395/502, 520–26, 162, 164

[56] References Cited

U.S. PATENT DOCUMENTS

| | | | |
|---|---|---|---|
| 5,129,059 | 7/1992 | Hannah | 395/166 |
| 5,208,608 | 5/1993 | Okuyama et al. | 364/108 |
| 5,265,199 | 11/1993 | Catlin | 395/122 |
| 5,301,263 | 4/1994 | Dowdell | 395/122 |
| 5,315,540 | 5/1994 | Lawless et al. | 364/764 |
| 5,321,809 | 6/1994 | Aranda | 395/164 |
| 5,392,392 | 2/1995 | Fischer et al. | 395/162 |
| 5,416,893 | 5/1995 | Herrel et al. | 395/122 |
| 5,444,845 | 8/1995 | Cho | 395/162 |

OTHER PUBLICATIONS

Eo, et al "Ringtree: A VLSI Architecture for Fast Image Generation and Processing", *Circuits and Systems, 1988 IEEE International Symposium*, pp. 801–804.

White, et al, "Workstation Graphics—Rendering Hardware", *IEE Colloq., 1992, No. 10: Computer Graphics Systems*.

Dowdell, et al, "Scalable Graphics Enhancement for PA–RISC Workstations", *COMPCON Spring '92 IEEE Computer Society International Conference*, pp. 122–128.

Poulton, et al, "Breaking the Frame Buffer Bottleneck with Logic–Enhanced Memories", *IEEE Computer and Applications Magazine*, Nov. 1992, vol. 12, Iss 6, pp. 65–74.

*Primary Examiner*—Phu K. Nguyen
*Assistant Examiner*—Rudolph J. Buchel
*Attorney, Agent, or Firm*—Rothwell, Figg, Ernst & Kurz

[57] ABSTRACT

In a signal processing method for use in a three-dimensional computer graphics system, in order to increase the processing speed between the raster engine and a frame buffer, the frame buffer is accessed by an interleaving method and a Z-value comparison is performed in a Z-buffer of the frame buffer. The bandwidth of the frame buffer can be improved by executing a modify cycle in a memory.

4 Claims, 8 Drawing Sheets

SIGNAL PROCESSING METHOD AND APPARATUS FOR INTERACTIVE GRAPHICS SYSTEM FOR CONTEMPORANEOUS INTERACTION BETWEEN THE RASTER ENGINE AND THE FRAME BUFFER

This is a continuation of application Ser. No. 08/365,823, filed Dec. 24, 1994 now abandoned.

BACKGROUND OF THE INVENTION

This invention relates to a signal processing method and apparatus for a graphics system, and more particularly, to a signal processing method and apparatus for a computer graphics system which, by improving a bottleneck phenomenon between the raster engine and a frame buffer, is capable of increasing real-time processing capacity.

Recently, computer graphics arts are actively being developed for real-time processing of three-dimensional images. A three-dimensional computer graphics system has two main functions, that is, geometric processing and rasterizing, which are accomplished via pipelining. Using a geometric processor and a rasterizer, such a system processes an image object represented by primitives such as triangles and lines, which are stored in a frame buffer as transformed pixel data. The geometric processor, where floating point calculations such as geometric transformation, light modeling, clipping and perspective projection are executed, may be realized with a floating point processor or a digital signal processor. Many calculations of color value and concealed plane discarding, based on a shading model, for each pixel of the primitives, are executed in the rasterizer. Since the rasterizer processes relatively simple and repetitive calculations, the rasterizer is usually made of a specific VLSI chip. In three-dimensional graphics processing for discarding a concealed plane, a Z value for each pixel is read from a frame buffer and compared to an interpolated Z value, and then a final color value and Z value according to the comparison are stored in the frame buffer.

The above process requires a large amount of data to be communicated between the rasterizer and frame buffer, and the performance of most computer graphics system is influenced by a bottleneck phenomenon in the data communication. Therefore, a broadened bandwidth for the data communication will have a positive effect on the performance of a computer graphics system (refer to U.S. Pat. No. 5,321,809).

However, such prior-art computer graphics systems communicate data in pixel units between the rasterizer and the frame buffer, so that the system is disadvantageous for realtime processing, due to a slow processing speed.

SUMMARY OF THE INVENTION

Accordingly, it is an object of this invention to provide a signal processing method and apparatus for a computer graphics system which improves the bottleneck phenomenon between the rasterizer and the frame buffer due to a narrow bandwidth.

In order to accomplish the object, there is provided a signal processing method for a computer graphics system, wherein the method comprises: a first step where, while first span of a primitive is interpolated in an interpolating means and Z value is compared in first span Z buffer, the coordinates of second span is calculated from the coordinates of first span in a span generator, and Z value of the second span is pre-fetched from a memory bank of a frame buffer to be stored in second span Z buffer by using the coordinates of second span; and a second step where, while new Z value obtained from comparison in the first span Z buffer and color value calculated in a raster engine are temporally stored in first span Z and color buffer, the Z value and color value of former span stored in second span Z and color buffer is written in other memory bank of the frame buffer.

In order to accomplish the object, there is provided a signal processing apparatus in a computer graphics system, which includes a frame buffer for buffering Z value and color value calculated in a raster engine, wherein the raster engine comprises: a first span Z buffer for storing Z value of first span which is pre-fetched from first memory bank of the frame buffer and comparing the pre-fetched Z value to a new Z value; a second span Z buffer for pre-fetching and storing Z value of second span during the comparison operation of the first span Z buffer; a first span Z and color buffer for temporally storing the new Z value, which is obtained from the comparison in the first span Z buffer, and a calculated color value of the first span; and a second span Z and color value for writing stored Z value and color value of former span in second memory bank of the frame buffer during writing operation of the first span Z buffer and color buffer.

There is provided another signal processing method in a computer graphics system, where both first Z value written in front-end of an output buffer by addressing for designation of cell of Z buffer in a frame buffer and new Z value calculated in and transferred from a raster engine are compared by a comparator in a span Z buffer, the results of comparison is transferred to a memory control logic of the raster engine, and the new Z value and color value is written in the frame buffer by a write-enable signal of the memory control logic which is generated in response to the transfer.

There is provided another signal processing apparatus in a computer graphics system including a raster engine for calculating Z value and color value, where the raster engine includes a frame buffer for buffering the calculated Z value and color value, wherein the frame buffer comprises a color buffer and a Z buffer for comparing Z value therein and outputting a signal in a result of the comparison, and wherein the raster engine comprises an outer-control logic for decoding the result signal from the Z buffer of the frame buffer to generate a write-control signal and a memory control logic for supplying a write-enable signal to the color buffer and the Z buffer of the frame buffer in response to the write-control signal.

BRIEF DESCRIPTION OF THE ATTACHED DRAWINGS

The above object and advantages of the present invention will become more apparent by describing in detail preferred embodiments thereof with reference to the attached drawings in which.

DETAILED DESCRIPTION OF THE INVENTION

There are various methods for representing a three-dimensional object in a three-dimension computer graphics system. A method where an object is approximated to a polyhedron is very advantageous in that a polygon consisting of lines is planar and, thus, a linear property is available for use in connection with a concealed plane discarding algorithm and a rendering algorithm. An interactive three-dimensional computer graphics system usually uses a triangle, which is the simplest of polygons, in the modeling of an object. For example, the calculation amount and bandwidth for processing one million Gouraud-shaded triangles per second is as follows.

1. Calculation amount of a geometry processor

About two hundred floating-point calculations are needed for transforming a triangle from object coordinates into screen coordinates, and executing the clipping, light modeling and perspective projections. Since the calculation amount can be reduced by half if the triangle is given in a meshed type, a geometry processor (100MFLOPS) is needed in order to provide the above performance.

2. Geometry processing bandwidth

One triangle can be represented with about 40–200 bytes, considering geometric data (coordinate data of three vertexes, the surface normal value, and the surface normal value of the triangle), object color data representing color of the object, object surface parameters representing optical characteristic of the object (a diffusion coefficient Kd, transparency coefficient Kt, and specular coefficient Ks and glitter n), and screen data representing all the information for a given screen (data relating to an optical source and a view pyramid). Since these data parameters are similarly necessitated in object space, the bandwidth of the geometry processor for input and output should be about 40–200 Mb per second.

3. Calculation amount of a rasterizer

Generally, it takes a rasterizer to process enormous amounts of data where primitives usually consist of many pixels. A graphics system which uses a Z-buffer algorithm determines that primitives should be visible in all the pixels. For the calculation of a Z value, a linear interpolation (Gouraud Shading) using a forward difference, which is simply done by one fixed point calculation per pixel, is performed. Supposing that a triangle has 50 pixels on an average, the rasterizer has to execute 20–25 thousand fixed-point addition operations per second in order to execute the above function.

4. Bandwidth between a rasterizer and frame buffer

A computer graphics system reads a Z value from the frame buffer and compares it to the new Z value calculated in the rasterizer, for all the pixels in a primitive. For a visible pixel, the new Z value and color value of the pixel should be over-written in the frame buffer. Supposing that a triangle averages 50 pixels and only three-fourths thereof are visible, 12,500 frame-buffer-accessing operations per second are necessitated.

Figure 1:
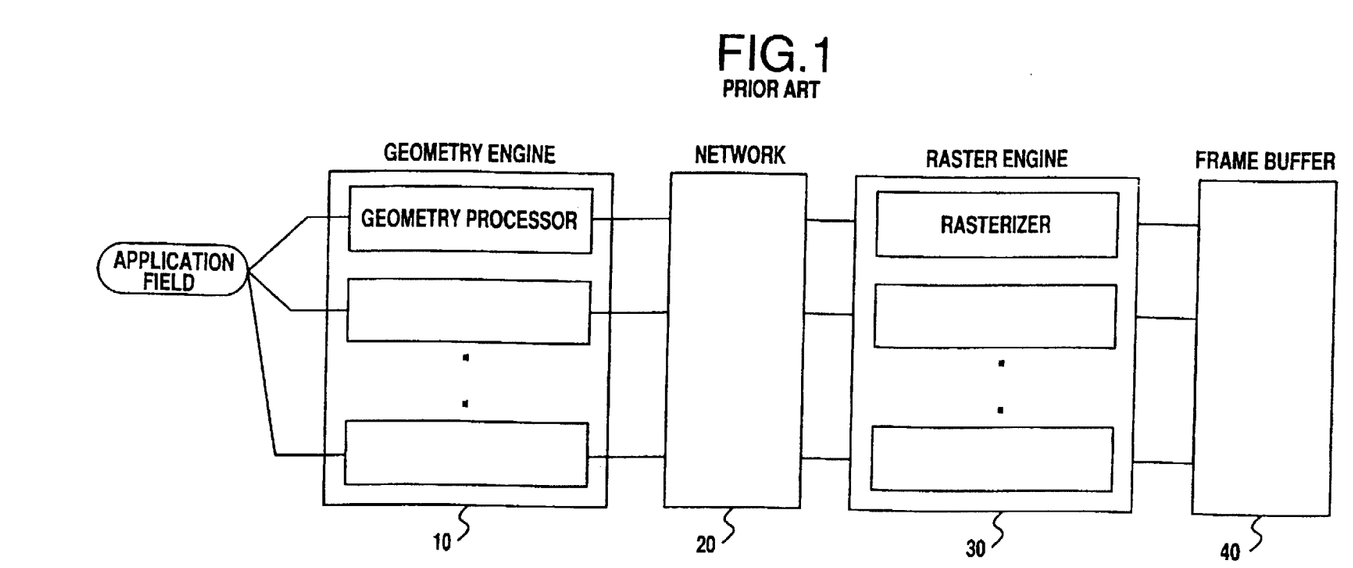
FIG. 1 is block diagram of a general computer graphics system having a multiple architecture.

A prior-art computer graphics system has the architecture of "multiple instruction multiple data (MIMD)" as shown in FIG. 1. The computer graphics system comprises a geometry engine 10 in which a plurality of geometry processors are constituted in parallel, a global network cross-bar switch or a ring network 20, a raster engine 30 in which a plurality of rasterizers are constituted in parallel, and a frame buffer 40. Data of triangle or span which are transformed into screen coordinates by geometry processing of the geometry engine 10 are transferred to the raster engine 30 through the network 20. The raster engine 30 calculates the new Z value and color value, compares the calculated values with the values of the frame buffer 40, and thereby stores final visible color value and Z value in the frame buffer. The frame buffer 40, which may be realized with a DRAM or VRAM, satisfies the bandwidth between the raster engine 30 and the frame buffer 40 by constituting a plurality of memory banks which allow the parallel accessing of a plurality of cells per memory cycle.

In designing a pixel-parallel raster engine, each frame buffer memory is segmented into sections whose size is mxn, where n is the number of scan lines and m is the number of pixels, and an interlaced frame buffer method where the rasterizer charges each section is mostly used. Generally, as mxn is smaller than the number of pixels in a primitive, each rasterizer charges a plurality of pixels in a primitive. Thus, the system of the MIMD architecture, which has buffering means such as a first-in-first-out (FIFO) circuit in a rasterizer thereof, evenly distributes loads to all rasterizers.

Since currently available DRAMs and VRAMs, having an access time of about 70 ns, can access the Z-buffer 600 million times per second in one "read-modify-write cycle," the frame buffer memory has to be divided into at least twenty sections in order to process one million triangles. A three-dimensional computer graphics system which processes one million triangles per second has the constitution of multiple geometry processors and rasterizers and an interlaced frame buffer, for increasing computing power and resolving the problem of access bandwidth. However, it is an obstacle of realizing effective frame buffer that access speed does not keep pace with the integration of semiconductor memory devices.

Figure 2:
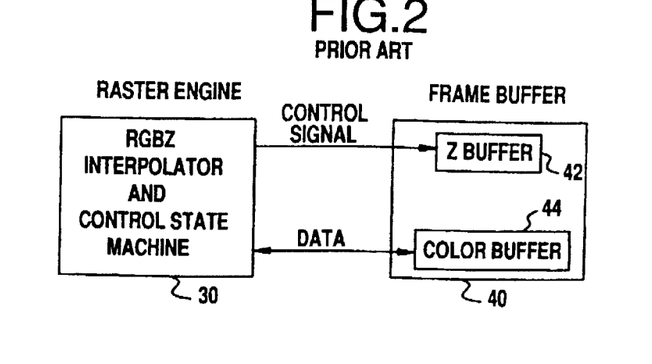
FIG. 2 is a drawing for illustrating a prior-art raster engine and frame buffer in a computer graphics system.

The cause of a bottleneck phenomenon of the frame buffer is as follows. The frame buffer 40 of a computer graphics system comprises, as shown in FIG. 2, a color buffer 44 for storing final color value which is calculated in the raster engine 30, a Z-buffer 42 for storing Z value and an overlay buffer (not shown). An early computer graphics system has a lot of overhead because the frame buffer consists of a DRAM and only about 25% of data processing time is allotted for accessing to the frame buffer in drawing of image, due to the screen refreshing operation depending on the characteristics of a given CRT, even though the rasterizer generates an image at high speed. However, in 1984, Texas Instruments has disclosed a VRAM which has a multi-port accessing function by which the rasterizer could access the frame buffer at the rate of the DRAM. The VRAM can fully utilize the access rate of a DRAM in view of drawing speed of the rasterizer, but the low access rate of a VRAM, in spite of its large capacity, is unavoidable due to the characteristics of the DRAM. Thus, time for updating of pixel may be in the sub-nanosecond realm when screen is complicated and high speed frame is generated. For example, if VRAM whose access time is 70 ns is used, the prior-art graphics system has to execute the "read-modify-write cycle" for which operations of reading Z value from Z-buffer, comparing and over-writing is done, for processing three-dimensional graphics. Based on a memory cycle being 160 ns for the above operation, an increased integration rate reduces a pixel-updating time for accessing the frame buffer, and the frame buffer made of highly integrated memory chips cannot satisfy the necessary pixel-updating rate. Therefore, in order to realize a high performance computer graphics system with highly integrated memory chips, the bandwidth for accessing the frame buffer has to be improved.

Thus, the present invention discloses an improvement of the bandwidth for accessing the frame buffer in order to use highly integrated memory chips.

Figure 3:
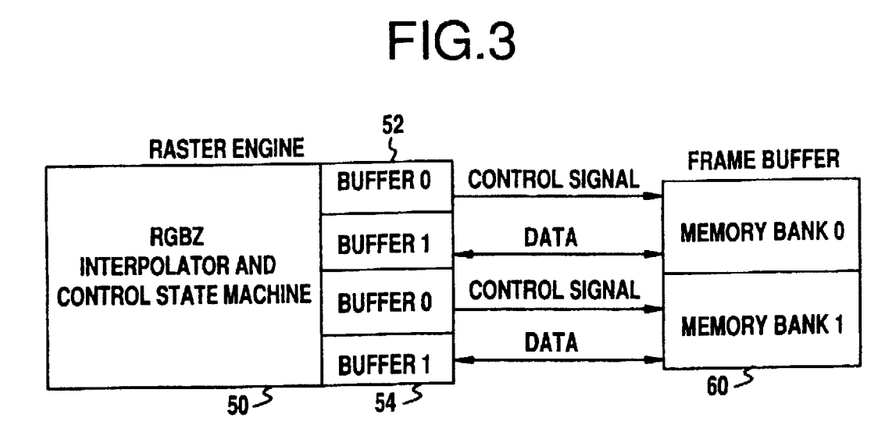
FIG. 3 is a drawing for illustrating an embodiment of a raster engine and frame buffer in a computer graphics system, according to the present invention.
Figure 4:
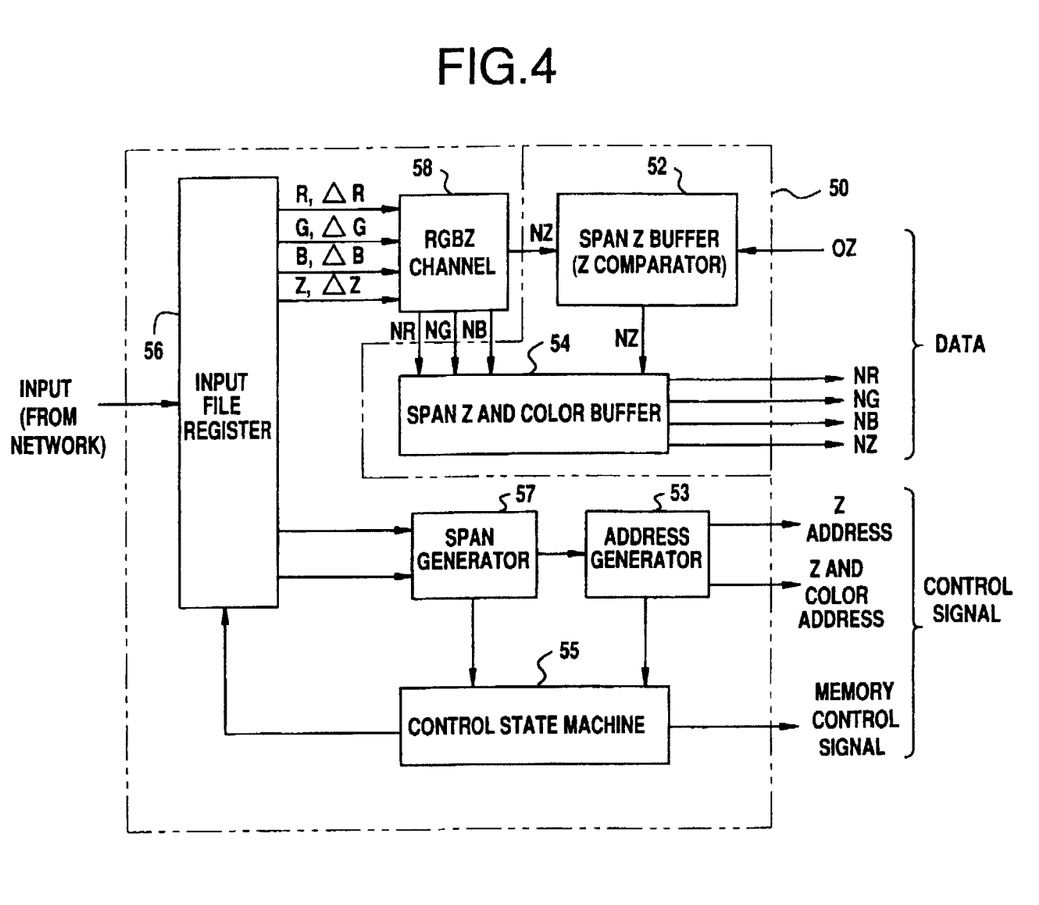
FIG. 4 is a block diagram of the raster engine shown in FIG. 3.
Figure 6:
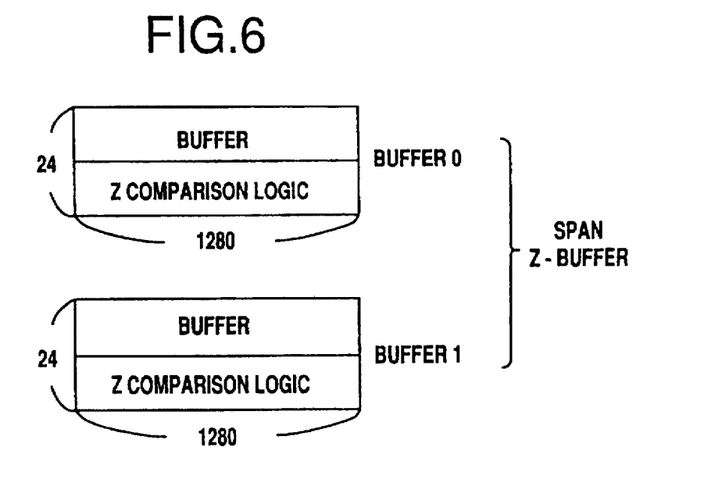
FIG. 6 is diagram showing an embodiment of the span Z buffer shown in FIG. 4.
Figure 7:
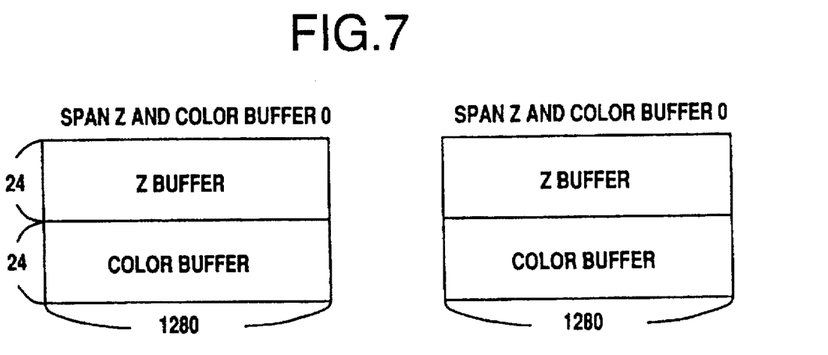
FIG. 7 is a diagram showing an embodiment of the span Z and color buffer shown in FIG. 4.

In an embodiment of the present invention, as shown in FIG. 3, a span Z-buffer 52 and a span Z and color buffer 54 are included in a raster engine 50. Referring to FIGS. 3 and 4, a new rasterizer (called a "SBUFRE"), according to the present invention, comprises an input file register 56, an RGBZ channel 58, a span generator 57, an address generator 53 and a control state machine 55, which constitutes a raster engine, and further comprises a span Z-buffer 52 and a span Z and color buffer 54 therein. The input file register 56 is for receiving input instructions, the RGBZ channel 58 is for interpolating color value and Z value for discarding a concealed surface, a span generator 57 is for calculating span coordinates, and the address generator 53 is for generating read/write addresses for the frame buffer 60. The control state machine 55 generates control signals for controlling the inner components of the "SBUFRE" and the frame buffer 60. As shown in FIG. 6, the span Z-buffer 52 consists of buffer 0 and buffer 1, each of which comprises a scan line buffer for storing Z value of "1280 pixels ×24 bits" and Z comparison logic, and compares old Z value of pre-fetched span with the calculated new Z value. The span Z and color buffer 54, as shown in FIG. 7, comprises a buffer 0 and buffer 1 whose size is 1280×48 bits, and temporarily stores therein the color value calculated in the RGBZ channel 58 and the new Z value obtained from the comparison in the span Z-buffer 52, in the unit of span, before writing the values in the frame buffer 60.

Therefore, it can improve the problem of bandwidth for accessing to the frame buffer 60 to read Z value by spans with the span Z-buffer 52 and the span Z and color buffer 54 and to simultaneously write the calculated Z value and color value in the frame buffer 60.

Figure 5:
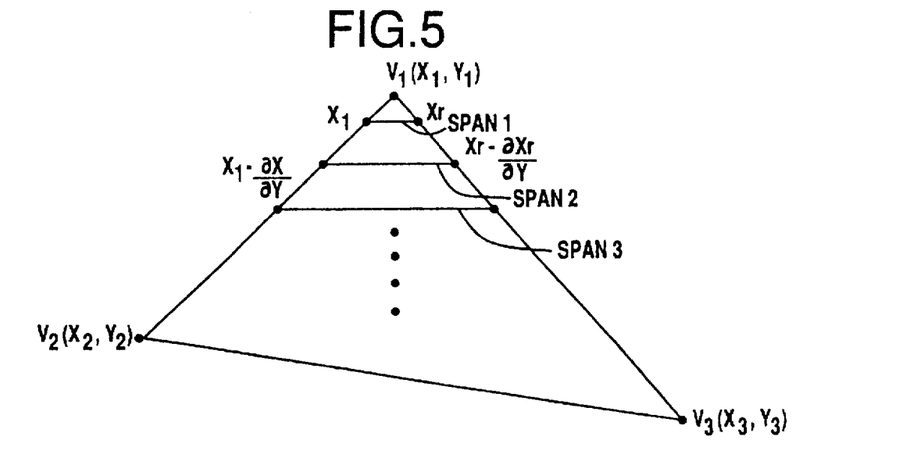
FIG. 5 is a drawing for illustrating of spanning in a triangle.

The operation principle of "SBUFRE" is as follows. That is, only the Z value of a triangle span is pre-fetched into the span Z-buffer 52 and then compared to new Z value which is interpolated in a rasterizer, per pixel. The old Z value read from the frame buffer 60 and the calculated new Z value, per pixel, are compared in the span Z buffer, and the resulting new Z value together with the color value calculated in the RGBZ channel 58 are written in the span Z and color buffer 54. It is advantageous to omit the "modify cycle" from of the "read-modify-write cycle" in a general computer graphics system, by writing the calculated Z value and color value in the frame buffer 60, in the unit of span, after temporarily storing in the span Z and color buffer 54, without directly writing the values in the frame buffer 60 by each pixel. While span 1 of a triangle shown in FIG. 5 is interpolated and the Z value comparison is done in the buffer 0 of the span Z-buffer 52, the span generator 57 calculates the coordinates of span 2 by subtracting $\partial x_l/\partial y$ and $\partial x_r/\partial y$ from initial values $x_l$ and $x_r$. Thus, the Z value of the span 2 is pre-fetched into the buffer 1 of the span Z-buffer 52 from the frame buffer 60. This operation can be performed apart from the operation of the RGBZ channel 58. That is, pre-fetching the Z values of successive spans to the buffer 0 and buffer 1, in turn, of the span Z buffer 52, and double constitution of the span Z and color buffer 54 can effectively utilize the access bandwidth between the rasterizer 50 and the frame buffer 60. The frame buffer 60 has a two-way interleaving structure, wherein, during pre-fetching of Z value from one memory bank thereof, the Z value and color value of the span Z and color buffer 54 is stored in another memory bank thereof without a memory cycle collision. The prior-art rasterizer processes three dimensional graphics in the "read-modify-write cycle," but the "SBUFRE" can pre-fetch the Z value into the span Z buffer 52 from the frame buffer having the two-way interleaving structure and simultaneously access the frame buffer 60 for writing the Z value and color value of the span Z and color buffer 54. Therefore, based on a memory whose access time is 70 ns, since one cycle of a random read or write mode is 130 ns while the "read-modify-write cycle" is 175 ns, the bandwidth for accessing the frame buffer can be improved by 24%. In addition, a page mode cycle for accessing is 35 ns while the read-modify-write cycle is 50, the bandwidth for accessing the frame buffer can be improved by about 60%.

Figure 8:
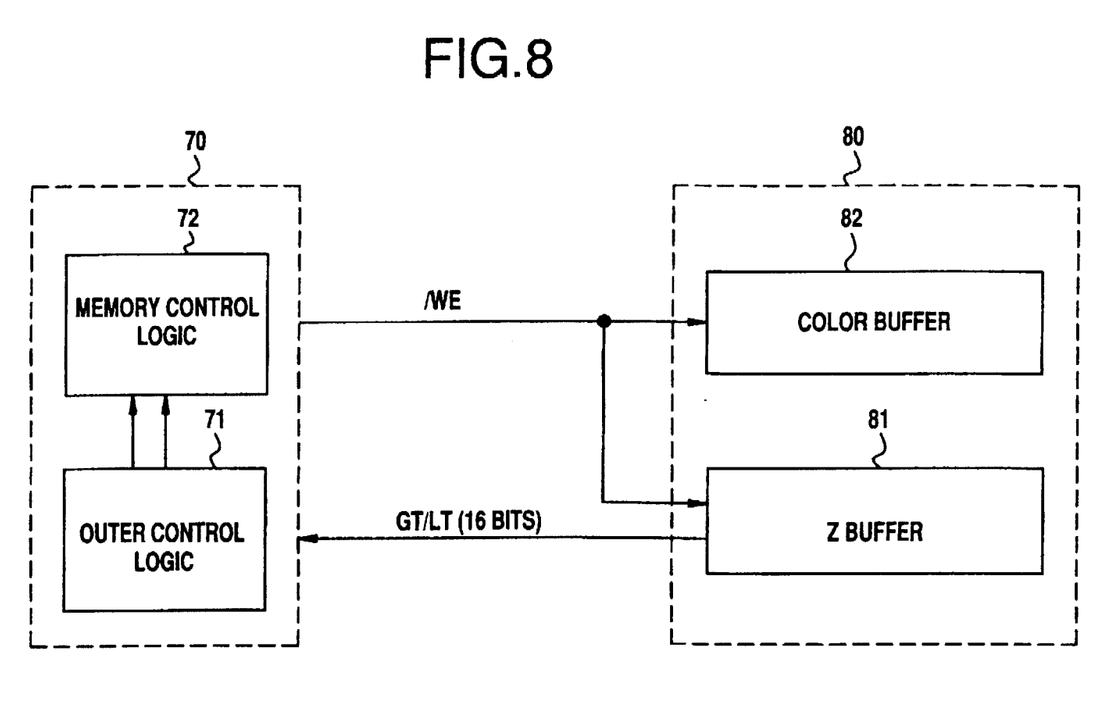
FIG. 8 is a drawing for illustrating another embodiment of the raster engine and frame buffer in a computer graphics system, according to the present invention.

Another embodiment of the present invention is shown in FIG. 8. The circuit includes a color buffer 82 of a frame buffer 80, a Z buffer 81 of a ZDRAM (a DRAM including a Z value comparator) for comparing Z values, and outer-control logic 71 for transferring the result of comparison to a memory control logic 72 of a control state machine in a raster engine 70. The bandwidth of the frame buffer can be improved by the usage of a ZDRAM which executes Z value calculations therein for three-dimensional graphics processing.

Figure 9:
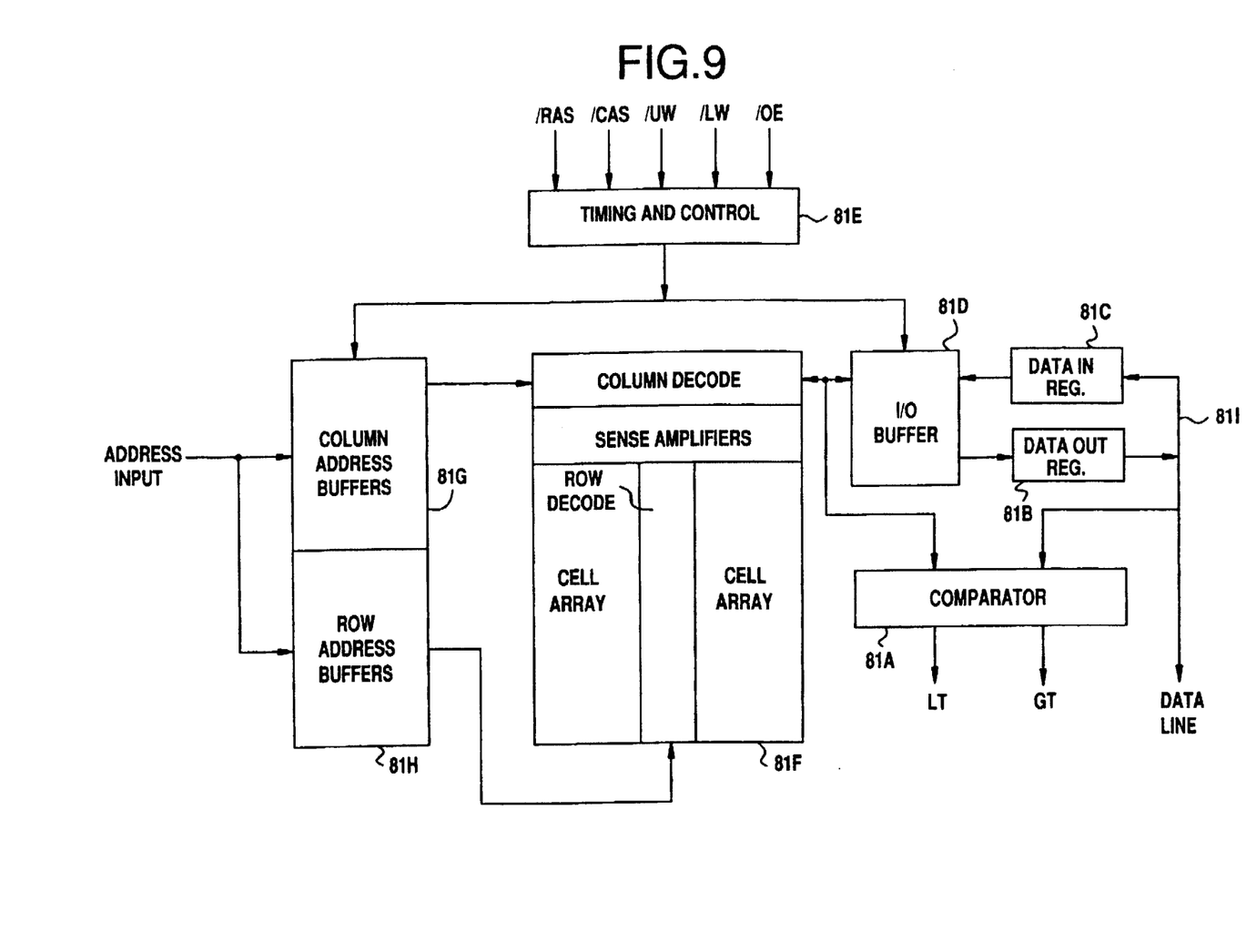
FIG. 9 is a drawing of an embodiment of the Z-buffer shown in FIG. 8, which is realized with a memory including a comparator.

Referring to FIG. 9, the ZDRAM, without being changed in architecture and cycle of conventional DRAM, comprises a comparator 81A which corresponds to 9 number of input/output bits, two outer pins used in transferring the result of comparison to the outer-control logic 71 of the raster engine 70, and the outer-control logic 71 provided in the raster engine 70 for decoding a write-signal of memory with receiving the information of comparison result (LT, GT). The Z buffer, that is, the ZDRAM, further comprises a data output register 81B, a data input register 81C, an input/output buffer 81D, a timing and controlling portion 81E, a cell core 81F which comprises a column decoder, a row decoder, a sense amplifier and a cell array, a column address buffer 81G and a row address buffer 81H.

Figure 10:
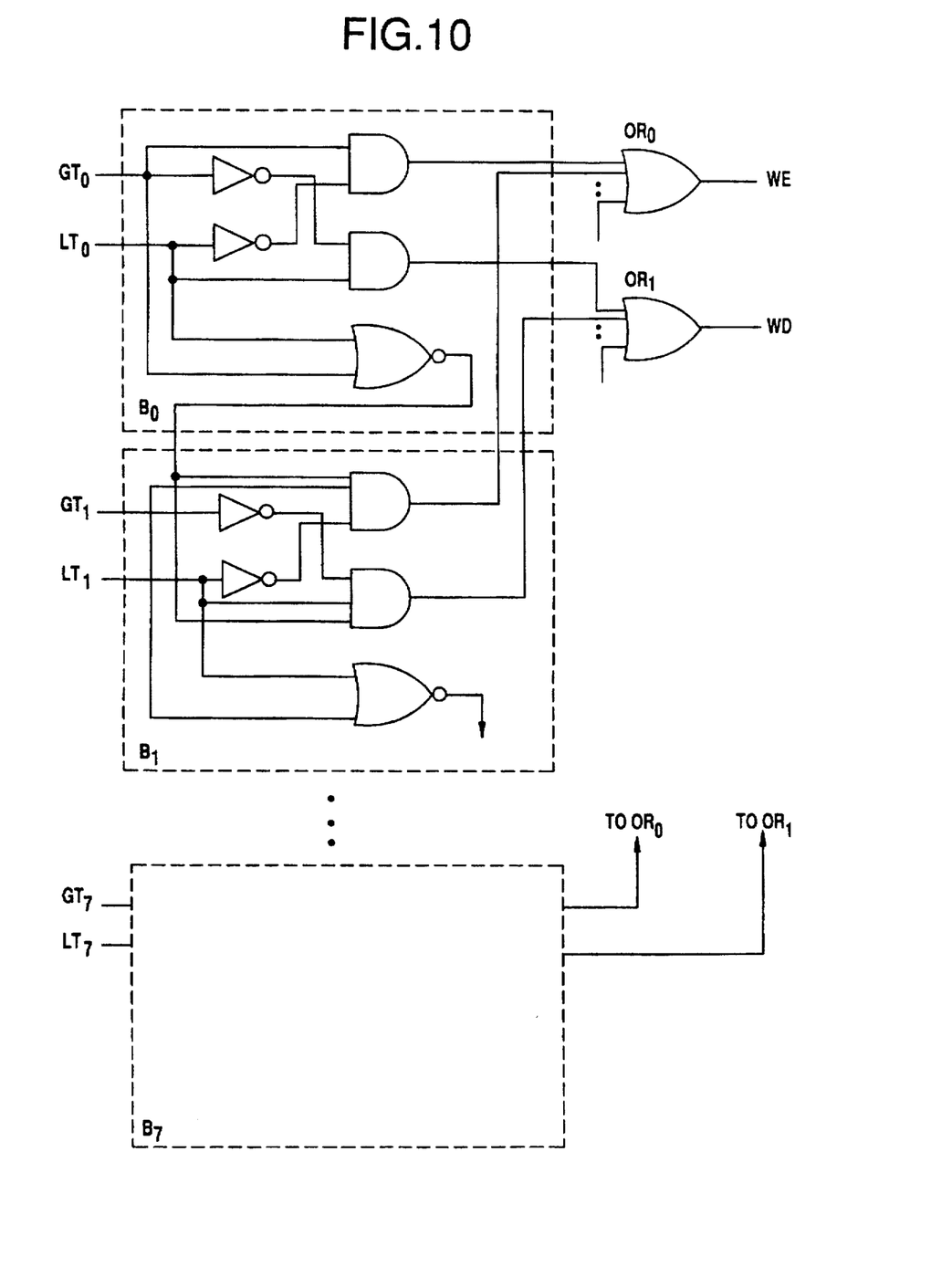
FIG. 10 is a circuit diagram of the outer-control logic shown in FIG. 8.
Figures 11A, 11B:
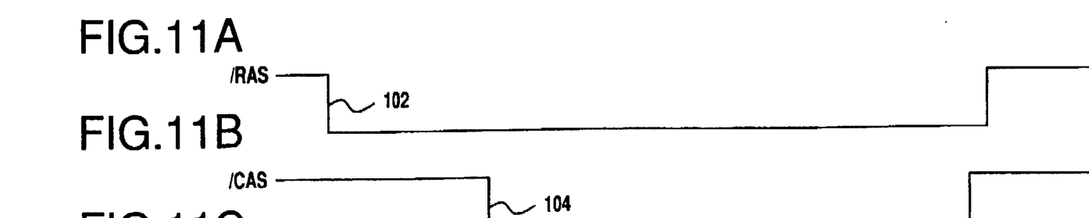
FIG. 11 is a waveform diagram for explaining the operation of the embodiment shown in FIG. 8.
Figure 11C:
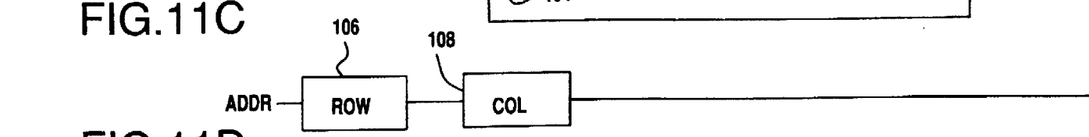
Figure 11D:
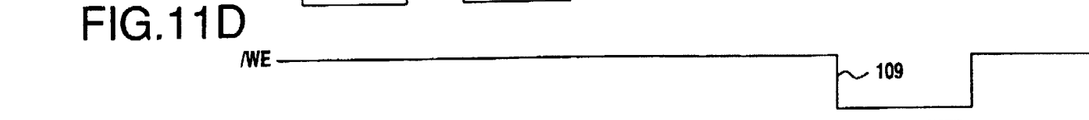
Figures 11E, 11F:
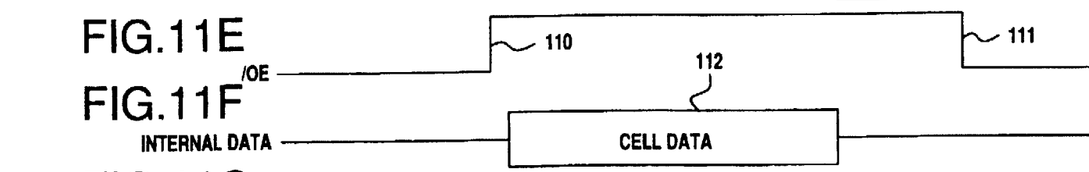
Figure 11G:
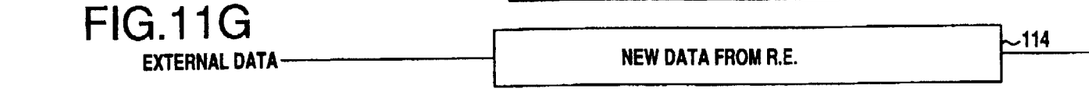
Figure 11H:
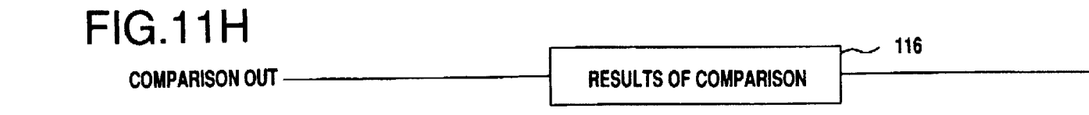

Referring to FIG. 10, the outer-control logic 71, which generates a memory write decoding signal, is a logic in composing a 32-bit Z-buffer with a memory of 8-bits per line. The outer-control logic receives eight information pairs of a comparison result (LT, GT) which is generated from each comparator 81A of eight memories, and generates write-enable signals and write-disable signals by decoding the information of comparison result (LT, GT) in decoding blocks B0–B7 respectively. Eight write-enable signals is input to $OR_0$ gate to be changed as final write-enable signal (WE), and eight write-disable signals is input to $OR_1$ gate to be changed as a write-disable signal (WD). The memory control logic 72 of the raster engine 70 generates a write-enable signal (/WE) according to the write-enable signal (WE) or the write-disable signal (WD), and provides a write control signal of the frame buffer 80.

Cycle of comparing operation in ZDRAM is acquired by modifying the write cycle of conventional DRAM. Late write cycle of DRAM is usually called an output enable controlled write cycle. In memory write cycle, writing operation is executed after designating of cell in memory chip by addressing. If memory cell array is addressed, DRAM makes data from cell not be output outside of chip through buffer by using the output enable signal (/OE), in the late write cycle, due to the characteristics where the data, which is stored in the memory cell array, corresponding to the address is transferred. ZDRAM uses the characteristics of the late write cycle of the DRAM.

Describing operation of FIG. 9 referring to FIG. 11, row address signal 106 of address signal (ADDR) is input to a row decoder of the cell core 81F by the row address buffer 81H at descending edge 102 of a row address strobe signal (/RAS), and column address signal 108 of address signal (ADDR) is input to a column decoder of the cell core 81F by the column address buffer 81H at descending edge 104 of a column address strobe signal (/CAS). Addressed cell data (internal data) 112 is supplied to the input/output buffer 81D and the comparator 81A. Here, new data (external data) 114 is directly supplied to the comparator 81A through data line 81I at a descending edge 104 of the column address strobe signal (/CAS), too. Accordingly, the comparator 81A compares the data 112 read from the cell and the input data 114, and supplies the result 116 to the outer-control logic 71 in the rasterizer 70. The outer-control logic 71 decodes the results 116 of comparison, and the memory control logic 72 receives the decoded result to generates the write-enable signal (/WE). The input data is written in the addressed cell by being latched in the input/output buffer 81D, in response with descending edge 119 of the write-enable signal (/WE), or the data of the input/output buffer 81D is delayed a predetermined time behind descending edge of the results of comparison and then output through the data line 81I.

As described above, the present invention can improve the bandwidth for accessing the frame buffer by about 50% by using a ZDRAM which executes the "modify cycle" therein, while a general computer graphics system adopts the "read-modify-write cycle" for a Z value comparing operation in a three-dimensional graphics calculation.

What is claimed is:

1. A computer graphics system signal processing method comprising:

writing a first Z value from a cell of a Z buffer in a frame buffer to a front-end of an output buffer of said Z buffer by addressing said cell;

calculating a new Z value in a raster engine;

comparing the first Z value with the new Z value using a comparator in said Z buffer; and driving memory control logic of the raster engine for writing the new Z value and color values in the frame buffer only in response to receipt of a comparison result from the comparator indicating that the new Z value should be written into the frame buffer.

2. A computer graphics system signal processing apparatus comprising:

a raster engine for calculating Z values and color values; and a frame buffer for buffering the Z values and color values, the frame buffer including a color buffer and a Z buffer, the Z buffer including a comparator for comparing Z values in said Z buffer with calculated Z values from said raster engine and outputting a signal responsive to the comparison, wherein the raster engine includes outer-control logic and write control logic for decoding the signal from the Z buffer, for generating a write-control signal only in response to the comparison signal from the Z buffer comparator, and for supplying a write-enable signal to the color buffer and the Z buffer in response to the write-control signal so as to write calculated Z and color values into said Z and color buffers respectively.

3. In a computer graphics system that includes a raster engine, a frame buffer, and a display screen, the raster engine including a plurality of rasterizers for computing pixel values for each primitive in a frame as a plurality of spans, each span being the intersection of the primitive with a scan line associated with a plurality of pixels on the display screen, the frame buffer storing the pixel values associated with the frame, and the display screen displaying the pixel values associated with the frame, a signal processing method comprising:

a) a first step of:
      ii) interpolating in the raster engine color values associated with a second span of a primitive;
      ii) calculating in the raster engine a new Z value associated with the second span; and
      iii) comparing in a first span Z buffer in the raster engine the new Z value associated with the second span with an old Z value associated with the second span and stored in the frame buffer;

b) a second step, executed contemporaneously with the first step, of:
      i) calculating screen coordinates of a third span of the primitive from screen coordinates of the second span stored in a span generator in the raster engine;
      ii) fetching an old Z value of the third span from a first memory bank in the frame buffer; and
      iii) storing the old Z value of the third span in a second span Z buffer in the raster engine at a location dependent on the calculated screen coordinates of the third span;

c) a third step of:
      i) selecting, in the first span Z buffer, between the new Z value and the old Z value associated with the second span of the primitive, the new Z value being selected if the new Z value is closer to the display screen than the old Z value; and
      ii) storing the selected Z value and the color values associated with the second span of the primitive in a first span Z and color buffer in the raster engine, the color values associated with the second span of the primitive being calculated in the raster engine; and d) a fourth step, executed contemporaneously with the third step, of writing a selected Z value and the color values associated with a first span of the primitive into a second memory bank in the frame buffer, the selected Z value and the color values associated with the first span being stored in a second span Z and color buffer prior to writing into the second memory bank.

4. A computer graphics system including:

a raster engine;

a frame buffer; and a display screen, the raster engine including a plurality of rasterizers for computing pixel values for each primitive in a frame as a plurality of spans, each span being the intersection of the primitive with a scan line associated with a plurality of pixels on the display screen, the frame buffer storing the pixel values associated with the frame, and the display screen displaying the pixel values associated with the frame, wherein the raster engine comprises:

a first span Z buffer for selecting between a new Z value and an old Z value associated with a second span of the primitive, the new Z value associated with the second span being calculated in the raster engine, the old Z value being fetched from a first memory bank in the frame buffer, the first span Z buffer selecting the new Z value associated with the second span if the new Z value is closer to the display screen than the old Z value;

a second span Z buffer for fetching and storing, contemporaneously with selection of a Z value associated with the second span in the first span Z buffer, an old Z value associated with a third span associated with the primitive;

a first span Z and color buffer for storing the Z value associated with the second span from the first span Z buffer and for storing the color values associated with the second span and calculated in the raster engine; and a second span Z and color buffer for storing, contemporaneously with storing of the Z value and color values associated with the second span in the first span Z and color buffer, a Z value and the color values associated with a first span of the primitive into a second memory bank in the frame buffer.

* * * * *